(12) United States Patent
Boehme et al.

(10) Patent No.: US 6,578,192 B1
(45) Date of Patent: Jun. 10, 2003

(54) METHOD AND SYSTEM FOR SUPPORTING DYNAMIC DOCUMENT CONTENT EXPRESSED IN A COMPONENT-LEVEL LANGUAGE

(75) Inventors: Richard F. Boehme, Kent Lakes, NY (US); Matthew J. Duftler, Tarrytown, NY (US); David A. Epstein, Ossining, NY (US); Joseph J. Kesselman, Ossining, NY (US); Sanjiva Weerawarana, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/421,376

(22) Filed: Oct. 20, 1999

(51) Int. Cl.[7] .................................................. G06F 9/44
(52) U.S. Cl. ...................................................... 717/115
(58) Field of Search .................................. 717/115, 120

(56) References Cited

U.S. PATENT DOCUMENTS

| | | | | |
|---|---|---|---|---|
| 6,083,276 A | * | 7/2000 | Davidson et al. | 709/200 |
| 6,182,277 B1 | * | 1/2001 | DeGroot et al. | 717/115 |
| 6,256,772 B1 | * | 7/2001 | Apte et al. | 717/100 |
| 6,292,936 B1 | * | 9/2001 | Wang | 707/513 |

OTHER PUBLICATIONS

North et al., "SAMS Teach Yourself XML in 21 Days", Macmillan Computer Publishing; Mar. 13, 1999; pp. 254–257.*

Binding et al., "Generation of Java Beans to Access XML Data", Web Information Systems Engineering, 2000. Proceedings of the First International Conference on, vol.: 2, 2000 pp.: 143–149 vol. 2.*

Johnson, "Bean Markup Language, Part 1 & 2", JavaWorld; Aug. 1999.*

Weissinger, "ASP In a Nutshell: A Desktop Quick Reference", O'Reilly publishing, Feb. 23, 1999, pp. 15–17 and 22.*

Wood, "Programming The Web: The W3C DOM Specification", IEEE Internet Computing, Feb. 1999, pp. 48–54.*

* cited by examiner

*Primary Examiner*—Todd Ingberg
*Assistant Examiner*—William Wood
(74) *Attorney, Agent, or Firm*—Whitham, Curtis, & Christofferson, P.C.; Stephen C. Kaufman

(57) ABSTRACT

This invention provides a computer-method for parsing by enabling scripts to be expressed in a language which is syntax-compatible with the document surrounding them. A document is loaded having script and non-script components. Script components are identified and delineated, and are then passed to an interpreter, which returns an object corresponding to each script component. Then, script elements in the original document are replaced with the last returned object from the interpreter. If the returned object is a suitable Document Object Model (DOM) Node, it replaces the script element in the document structure. If the object is not a DOM node, the server invokes its string conversion method to obtain a textual representation, and replaces the script element with that text. After all BML markup block elements in the document have been processed, the altered document is delivered to the client.

14 Claims, 4 Drawing Sheets

METHOD AND SYSTEM FOR SUPPORTING DYNAMIC DOCUMENT CONTENT EXPRESSED IN A COMPONENT-LEVEL LANGUAGE

CROSS REFERENCE TO RELATED APPLICATION

The subject matter of this application is related to the disclosure of co-pending application Ser. No. 09/207,046 filed Dec. 8, 1998 by Sanjiva Weerawarana, David A. Epstein, Matthew J. Duftler and Francisco P. Curbera for "Component Wiring Language" and assigned to a common assignee herewith. The disclosure of application Ser. No. 09/207,046 is incorporated herein by reference.

BACKGROUND OF THE INVENTION

1. Field of the Invention

The present invention generally relates to a computer-implemented method for parsing by enabling scripts to be expressed in a language which creates, configures, and connects separately developed software objects to perform the scripted tasks. In a particular application, the method provides these services locally or on the World Wide Web (WWW). Information can be displayed that is generated or retrieved based on parameters supplied by users, in combination with data from other sources, and that is embedded into the framework of a markup language that can be represented in memory by the World Wide Web Consortium (W3C) Document Object Model (DOM).

2. Background Description

Initially, Web pages were static, and displayed the same information to everyone who viewed it. The Web page would remain the same until the Web Page document was edited.

Creating dynamic Web pages, where the HyperText Markup Language (HTML) tags or textual content is produced or altered automatically without human intervention, is undeniably the trend. It is now common for Web pages to offer search engine results, display information from a database, allow users to view guestbooks, or dynamically provide a frameless version for users who do not want or cannot display frames. Web services often want to display information generated or retrieved at the time the user requests them, based on parameters supplied by the users in combination with data from other sources, embedded into the framework of an HTML document.

Traditionally, dynamic content has been generated by either purely programmatic methodology such as a Common Gateway Interface (CGI) script or simple servlet, or a scripting language in the HTML page. A CGI script is a small program written in a script language such as Perl that functions as the glue between HTML pages and other programs of the Web server. CGI scripts have been the initial mechanism used to make Web sites interact, for example, with databases and other application programs. A servlet is also a small application, typically programmed in Java or Perl, that runs on an Internet or intranet server.

Microsoft's Active Server Pages (ASP) is used to create web pages written in Visual Basic (VB) Script or JScript™ that allow the web pages to interact with databases and other programs. Another alternative, Sun Microsystems JavaServer™ Pages, allows users to write their HTML framework, by inserting sections that are intercepted by the server and handed off to a programming language such as Java to perform the requested calculations.

Referring now to the drawings, FIG. 1A is a logical flow diagram illustrating the prior art ASP logic flow process. As shown in block 001, when a user requests an ASP document from the server, a source document is loaded from the repository of the server. In decision block 002, the document is scanned to determine ASP content. In decision block 003, when an ASP sequence is encountered, as indicated by the "<%" and "%>" delimiters, the contents of the sequence, along with some context objects that provide the parameters to the script, are handed off to a scripting language interpreter 004. Typically, most text (the HTML content of the page) from the test in decision block 003 is not in the form of an ASP script, and is consequently written directly to the output stream 005. Finally, when the test in decision block 002 determines that there is no more text, the output stream is delivered to the client as a generated web page, as shown in block 006.

The languages used for ASP scripting have all been fairly traditional step-by-step procedural languages. The present invention differs in its use of a language that instead describes how to assemble the scripting task from reusable software components, and in its use of document-structure rather than text-based interpretation (facilitated by the use of a scripting language which is syntax-compatible with the document markup language). Some of these languages do have object-based capability, but the user must explicitly code the low-level details of object creation, configuration, connection and invocation.

FIG. 1B is a logical flow diagram illustrating the prior art JavaServer™ Pages (JSP) logic flow process. Unlike ASP, JSP uses Java as its scripting language, and is generally compiled to create a servlet rather than being interpreted. When the user requests a JSP document, the server begins by checking whether a compiled version is available, as shown in decision block 101. If compilation is required, the source document is loaded, as shown in block 103, and scanned for JSP content to determine if there is more text, as shown in decision block 104. When a JSP sequence is encountered as shown in decision block 105, its contents are instead written out as procedural Java code, as shown in block 107. Most text (the HTML content of the page) is turned into print ( ) calls which will generate corresponding text into the output stream, as shown in block 106. The generated Java is compiled to create a servlet, as shown in block 108. Finally, the servlet, whether just compiled from block 108 or previously generated as determined by decision block 101, is invoked in an execution context that permits it to retrieve the parameters to the script, as shown in block 102. This servlet generates the output stream which is delivered to the client as a generated web page.

There are several disadvantages associated with these previous solutions. The most important one is that the web page developer is asked to deal with the complexities of writing and debugging executable code.

The traditional scripting languages also expose an excessive amount of detail for most dynamic content generation tasks. Their flow-control capabilities are rarely needed, and increasingly their calculating abilities go unused as well. Instead, they are often used only as a way of accessing and manipulating software objects either instantiated on demand or already residing in the processor environment of the document. One way to think of this is having gone from directly coding an operation to putting one together out of building blocks.

For example, a script may retrieve an account number from the user's request (an object provided by the evaluation environment), use it to look up the user's profile in a customer database (another object), combine the retrieved data with other information provided by the user, submit the result to an order processing engine (yet another object), and paste the resulting confirmation number into the generated webpage acknowledging the order. In more complicated scenarios, the script may set up communications channels ("wiring") between several objects and then "step out of the way", letting them actively negotiate among themselves to perform the requested task.

This object-oriented approach facilitates the reuse of solutions from one page to the next, easing the development and debugging task, and takes better advantage of existing code. Of course, this is not unique to the scripting environment, as programmers have been moving in the direction of plug-together software modules. But for the most part, they have used the same languages both to develop those modules and to apply them to specific tasks.

The syntactic details of using a general-purpose language to manipulate these objects can be complex enough to obscure the logic of the operation, and can be a source of programming errors. A language which hides these details, and directly represents the process of assembling a solution from software objects, will be easier for humans to write, to read, and to maintain. These advantages are especially important for authors of dynamic web pages, who often have limited programming experience.

The same simplification of syntax should also make such a language easier for other programs to manipulate. This opens up the possibility of assembling the software modules differently for different users or different requests, taking the dynamic webpage concept a step further by allowing dynamic decisions not just about the actions being performed and values being displayed, but about the computational structure used to generate those values.

SUMMARY OF THE INVENTION

It is therefore an object of the invention to facilitate parsing by enabling scripts to be expressed in a language which is syntax-compatible with the document surrounding them.

It is another object of the present invention to provide a component-level approach to describing the operations to be performed by a script.

It is yet another object of the invention to allow scripts to be interpreted or compiled according to webpage conditions.

Bean Server Pages (BSP) leverages the Bean Markup Language (BML), an (Extensible Markup Language) XML-based language for describing how to create, configure, and connect software components. The BML is disclosed in co-pending application Ser. No. 09/207,046 filed Dec. 8, 1998 by Sanjiva Weerawarana, David A. Epstein, Matthew J. Duftler and Francisco P. Curbera for "Component Wiring Language" and assigned to a common assignee herewith. The disclosure of application Ser. No. 09/207,046 is incorporated herein by reference.

In a preferred embodiment, BML satisfies these objectives for XML-based documents, and for HTML-based documents given a suitable parser. Those skilled in the art will realize that the invention can also be practiced utilizing other document/script language pairs which use a different meta-syntax, and that even within the HTML/XML framework, web pages are only one application.

The BML, written by members of IBM's T.J. Watson Research Center, can be used to create new beans, access, and configure beans by setting/getting their properties and fields, bind events from some beans to other beans, and call arbitrary methods in beans. The language is designed to be directly executable. Processing a BML script results in a running application configured as described in the script.

To process a webpage which uses BSP, the portions of the document intended as BSP scripts are identified structurally. In a preferred embodiment of the present invention, this structural delineation is done by enclosing the BML code in a <BSP/> element. Those skilled in the art will realize that other approaches, such as using XNL Namespaces, may be equally practical. Once recognized, the BSP scripts are handed off to an interpreter, which processes them as blocks of BML code.

Since the BML code may instantiate or access software objects as necessary, it can perform whatever data-gathering or computation is required in order to produce the final form of the document. The BSP environment may also allow this interpreter to directly access the document being processed, perhaps via the W3C's DOM. One obvious application of this would be a script that scans the entire document for information to build a table of contents.

There are several ways in which the BSP script might pass its results back to the document. The simplest is to return a value which will replace the BSP script in the processed document. In a preferred embodiment of the present invention, the object returned by the last BML element of the script is taken as this returned value. Since the preferred embodiment is DOM-based, the replacement action takes one of two forms. If the returned object is a compatible DOM node (which might represent anything from a few characters to an extensive and complex document structure), it is inserted directly into the document being processed. If the object is not a DOM node and so could not be inserted, the BSP engine invokes its toString( ) method to obtain a textual representation, build a DOM Text node from that, and insert the resulting node.

If the BSP script is given direct access to the document being processed, as discussed above, it may also have the option of acting directly upon the content of the document to perform more global alterations in style and/or content. The additional power, and additional responsibilities, involved in permitting this is self-evident.

This approach avoids the previous problems and permits a simplified approach to creating dynamic web pages. The advantages gained from this invention are the ability to step up to a higher-level description of the operations to be performed by the script and simplified script interpretation and execution.

Using an XML-based scripting language also opens up the opportunity to use other XML processing tools beyond editing and interpretation. For example, it now becomes much easier to have style sheets written in the Extensible Style Language (XSL) manipulate the scripts within a page, inserting and removing portions of code before the scripts are interpreted. This may further increase the ability of dynamically-generated content to adapt to the needs of individual users.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The detailed description is provided in terms of an implementation in HTML (or Extensible HyperText Markup Language (XHTML)) and BML. However, as those skilled in the art will recognize, the invention can also be practiced using other document markup languages and component-software languages. As this embodiment demonstrates, implementation is greatly facilitated when the two languages use a common syntax such as XML, permitting the scripted document to be parsed in a single pass.

Figure 1A:
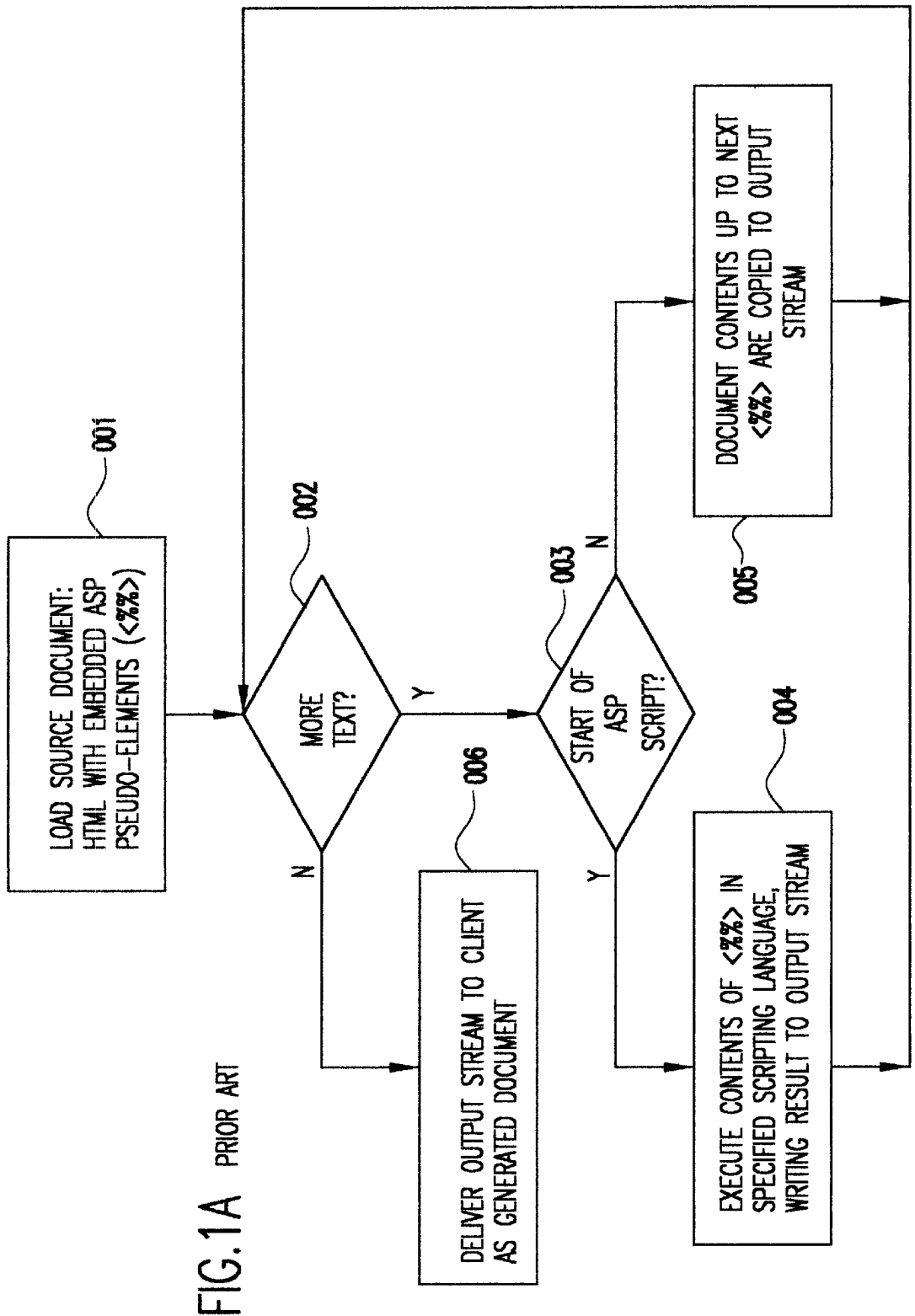
FIG. 1A is a logical flow diagram illustrating the prior art Active Server Pages (ASP) logic flow process.
Figure 1B:
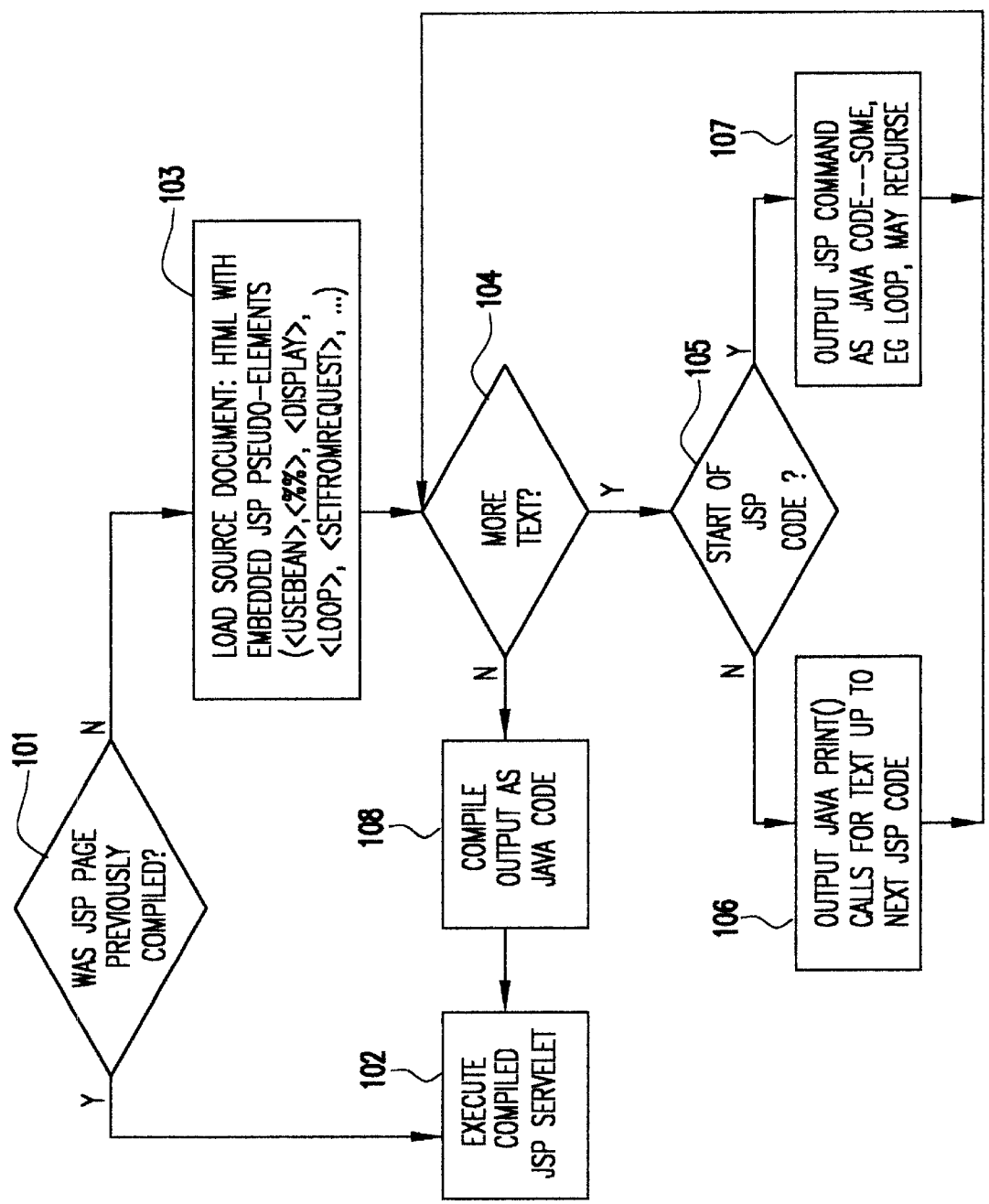
FIG. 1B is a logical flow diagram illustrating the prior art JavaServer™ Pages (JSP) logic flow process.
Figure 2:
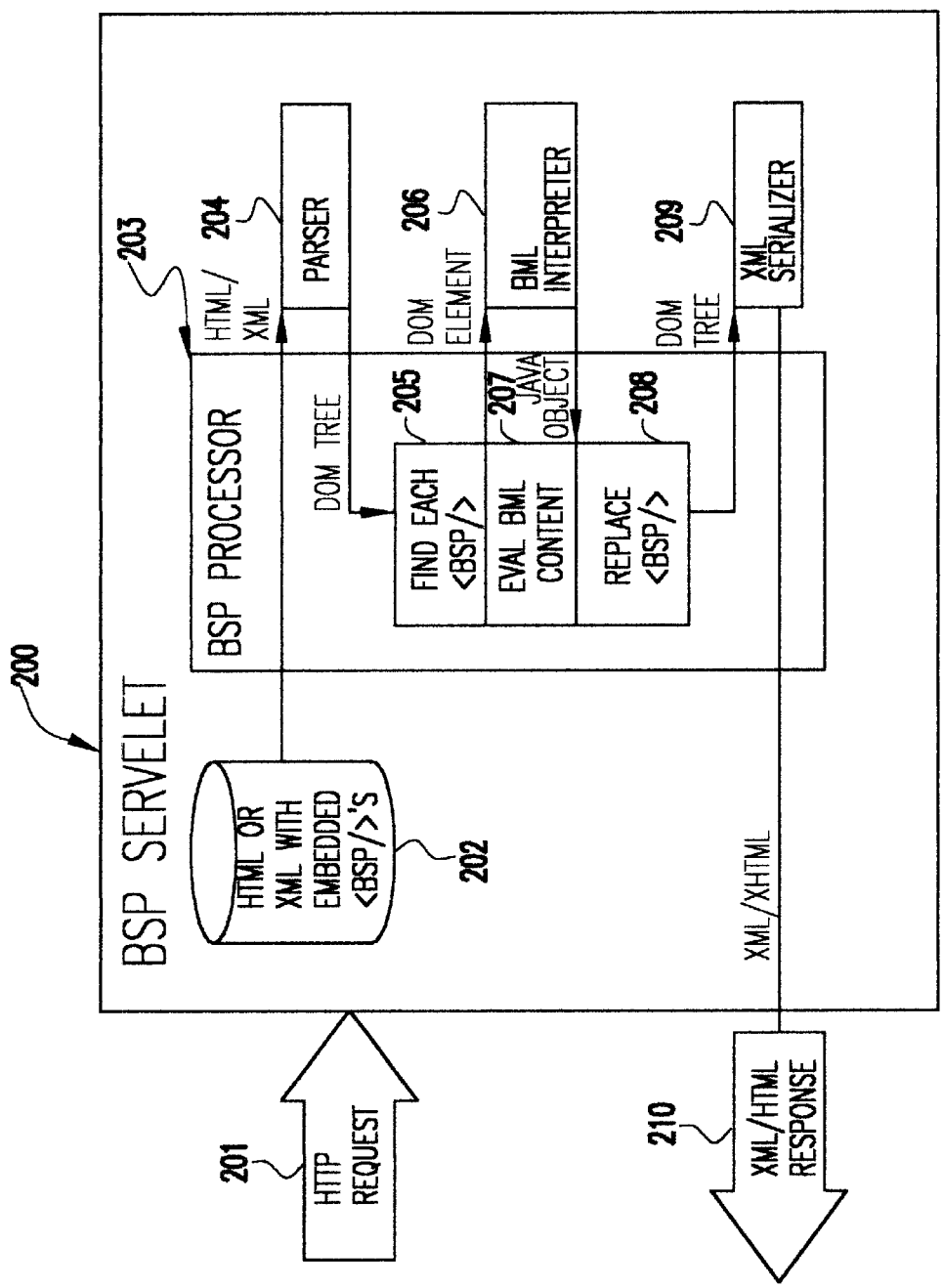
FIG. 2 is a block diagram illustrating the components of a BSP Servelet according to the present invention.

FIG. 2 shows a block diagram illustrating the generalized client-server environment for a preferred embodiment of the present invention. The embodiment of the server-side BSP application is a BSP servelet 200 which can be plugged into a standard web server to give it the ability to recognize and process BSP files. When the server recognizes that an HTTP "get" request 201 is intended to be served by running this servelet, the request 201 is passed into the doGet( ) method of the BSP servelet 200. The BSP servelet 200 parses this request as shown in block 204, retrieves the specified source file from storage 202, passes that file through the BSP processor 203, and returns the resulting data stream from the XML serializer 209 to the web server and then to the client.

The BSP processor 203 itself consists of several elements. The BSP processor 203 begins by passing the BSP source file out to the HTML or XML parser 204 for rendering a DOM representation, which is easier for a program to manipulate than XML textual form. The BSP processor 203 then does a preorder top-down left-to-right walk through the DOM tree, searching for <BSP> elements, as shown in block 205. Each such element encountered is processed by passing its child elements, in left-to-right order, to a BML interpreter 206, along with context information describing the HTTP "get" request 201 and a reference to the "Document" root node of the DOM tree.

Each call to the interpreter 206 returns a reference to a Java object, or the "null" reference in lieu thereof. Only the object returned by the last such call in each <BSP/> evaluation is retained, becoming the "returned object". The BML context of the object is evaluated in block 207. As previously discussed, either the evaluated object, if it is a suitable DOM node, or its string value, after being turned into a DOM Text Node, is used to replace the <BSP/> element in the DOM tree structure, as shown in block 208. Processing then advances to the next <BSP/> element.

When all <BSP/> elements 205 in the original source document have been processed, the altered DOM tree is passed to a serializer 209, which generates an XML or HTML representation of the resulting document. That document stream is returned to the servelet 200, which is the code that invoked the BSP processor 203.

Note that the parser 204, the interpreter 206, and the serializer 209 account for the most complex tasks in the BSP processor, and are pre-existing code. The present invention enables the processing loop to be relatively simple largely because the static document structure and the embedded BSP and BML are syntax-compatible, and hence can easily be served by a single parser and DOM representation.

Obviously, the present invention contemplates several variants of the BSP servelet 200. For example, rather than basing this design on the DOM tree model, the parser 204 could generate a SAX (Simple Application Program Interface (API) for XML) stream and process that, using a SAX-compatible version of the BML Interpreter. Another option would be to use a BML compiler to produce a Java class for each <BSP/> element and invoke that.

As noted previously, the BSP concept is not restricted to server applications. For example, a document with embedded BML content can be delivered to a client interpreter such as an applet, plug-in, or other browser extension. Within the client interpreter, an essentially similar BSP processor engine could run, with effects ranging from simple document alterations (similar to document styling and dynamic HTML scripts) to instantiating Java objects up to and including applets with their own user interfaces. If BSP processors are present on both client and server, this opens up a number of interesting possibilities. For example, server-side BSP might launch an application and provide BSP which the client-side BSP engine would run to build a specialized client for that application. Or the server-side BSP might alter the BSP it delivers to the client and thus cause the client to launch an applet tailored to this particular user's needs.

Figure 3:
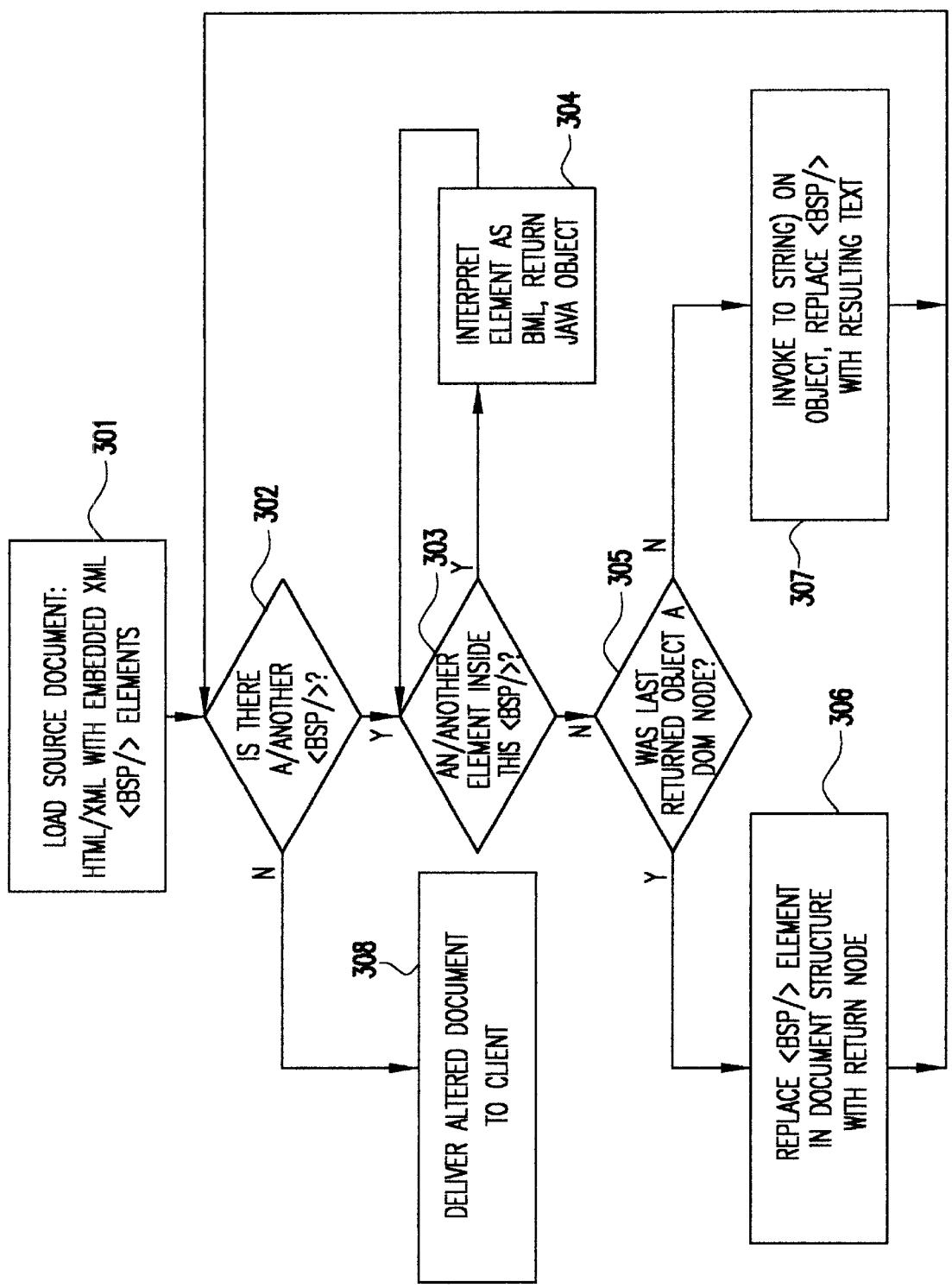
FIG. 3 is a logical flow diagram illustrating the interpretive BML processor process of the present invention.

FIG. 3 is a logical flow diagram illustrating the interpretive BML processor process. As shown in block 301, the source file utilizes HTML, with BSP elements (<BSP/>) embedded within it. The <BSP/> elements serve as an interpretation boundary, dividing the surrounding HTML from the enclosed executable BML. Those skilled in the art will realize that namespaces, or other programming techniques, could be used to achieve the same purposes.

In decision block 302. a determination is made whether there is another <BSP/> element in source file from step 301. In a preferred embodiment, processing a BSP page is done by walking through the document sequentially, from beginning to end. Anything outside a <BSP/> element is assumed to be HTML, and is passed through unchanged. When a <BSP/> element is encountered, a determination is made in decision block 303 whether there is another element inside the <BSP/>. If yes, each contained element ("children" in the DOM sense) in turn is passed to the standard BML interpreter ("BMLPlayer") for execution, as shown in function block 304. The interpreter is also provided with information about the document and its context, which the BML code may access. Each invocation of the BML interpreter returns a Java object. The object returned by the last invocation of decision block 304 before the end of the <BSP/> element is taken as the "returned value" of the BSP script. This object is used to replace the entire <BSP/> element and its contents in the generated document as presented to the user.

The details of that replacement depend of the datatype of the returned object, as shown in decision block 305. If it was a DOM node, which represents XML structure and content, it directly replaces the <BSP/> element in the generated document, as shown in function block 306. If the test in decision block 305 indicates that the returned object is not a DOM node, the BSP processor invokes its toString( ) method to obtain a textual representation, and the <BSP/> element is replaced with that text as shown in function block 307. Finally, after the entire document has been processed, the resulting generated document is delivered to the client, as shown in function block 308.

Returned objects, whether DOM nodes or not, may contain additional HTML and XML markup. In particular, they may contain additional <BSP/>blocks, which the server may wish to process in turn. Alternatively, they could contain additional executable BML, expressed as <BSP/> elements or in a similar form, intended for execution by the client after it receives the generated webpage. This would permit a BML Server Page to custom-assemble an applet to suit the needs of a particular user, and deliver that logic as BML embedded directly into the initial HTTP response instead of downloading and instantiating the applet separately after the HTML has been received.

To illustrate how the claimed invention works, a simple BSP webpage that uses commonly-understood software components to announce the current time is provided as follows:

To get the contents of the GregorianCalendar into a human-readable form, we need a formatting engine—in this case, a SimpleDateFormat object shown in line 5, which introduces a sequence in which we both create and configure that object, and assigns the name "formatter" to the resulting component.

While the GregorianCalendar did not require parameters to control its initial creation, SimpleDateFormat does. These parameters—in Java terms, the arguments to its constructor—can be expressed by enclosing them in an <args> element. In fact, exactly one such parameter is required: a String object which describes the formatting operations to be used in extracting and rendering the GregorianCalendar's contents. Since that is the only parameter, the <args> block can be closed, as shown in line 8.

```
<HTML> <BODY>                                                                    (1)
    <STRONG>Welcome!</STRONG> The time is                                        (2)
        <BSP>                                                                    (3)
            <bean id="calendar" class="java.util.GregorianCalendar"/>            (4)
            <bean id="formatter" class="java.text.SimpleDateFormat">             (5)
                <args>                                                           (6)
                    <string>h:mm:ss zzz</string>                                 (7)
                </args>                                                          (8)
                <property name="timeZone">                                       (9)
                    <call-method target="class:java.util.TimeZone" name="getDefault"/>  (10)
                </property>                                                      (11)
            </bean>                                                              (12)
            <call-method target="formatter" name="format">                       (13)
                <call-method target="calendar" name="getTime"/>                  (14)
            </call-method>                                                       (15)
        </BSP>                                                                   (16)
at our server,                                                                   (17)
        <BSP>                                                                    (18)
            <property source="BSP_request" name="serverName"/>                   (19)
        </BSP>, assuming our clock is set correctly.                             (20)
</BODY> </HTML>                                                                  (21)
```

With reference to FIGS. 2 and 3, processing begins when an HTTP request for this page 201 is sent to the BSP servlet 200, which responds by loading lines 1–21 of the above source code 202, 301, parsing it 204, and presenting the resulting document model (in this implementation, a DOM tree) to the interpretation loop within the BSP processor 203. In turn, loop 203 processes the document as follows:

As shown in line 1 of the above code, the program begins with the standard "boilerplate" for an HTML document. Since this is HTML content, no special action need be taken. While still in the HTML domain, the creation of the static contents of the webpage is started. Note that normal HTML markup may be used.

At this point, the computed content is introduced. Specifically, the <BSP> tag in line 3, and the matching </BSP> in line 16, serve to delimit the BML code which will perform this computation 205, 302. Each child element in turn will be processed by the BML interpreter (207, 206, 303, 304).

The first stage of generating the timestamp is to retrieve the current time in a convenient internal representation, as a GregorianCalendar component. We have assigned this object the name "calendar", as shown in line 4, so we can refer back to it later in the webpage. (Note that in this instantiation, objects created during the interpretation of a page persist for the duration of the evaluation of that page, and may be referred to in later <BSP/> blocks. Thereafter, they are discarded unless explicitly stored into longer-term storage such as the session model of the server. Variants in this persistence model are possible, of course.)

When first created, SimpleDateFormat assumes a particular time zone. If the server is running in a different time zone than that assumed, an incorrect result would be provided. Therefore, to change that value, the timeZone property of the SimpleDateFormat is set. Note that the fact that the property-change request occurs within the <bean> that created it provides the context information, and that the user does not have to further specify that the SimpleDateFormat is being modified.

The contents of the <property> element specify the value to be assigned to this property. The actual time zone at this server can be obtained from the TimeZone class's getDefault operation, as shown in line 10. Note that in this case we are calling a class's static method, and that no TimeZone object is required. This completes the property-change request. The SimpleDateFormat object is now fully configured, so its definition block can be closed, as shown in line 12. Note that each of these <bean> elements are in fact returning the created object to the BSP evaluation engine, since they are first-level children of the <BSP> element. But since additional elements follow them, those objects are not used to generate document content.

Now that the components have been properly configured, they can be used to generate the desired content for our web page. To do so, the "format" operation is invoked. Like the <args> in lines 6–8 and the <property> change in lines 9–11, the contents of the <call-method> element provide the parameters required for this operation.

SimpleDateFormat.format( ) requires one parameter, that being a Java Date object to be formatted. The value of the GregorianCalendar object can be obtained in that form by calling its getDate method. Since that is the only required parameter, the <call-method> block is ended as shown in line 15, and the of the format operation (a StringBuffer object containing the timestamp in human-readable form) is returned to the BSP interpreter.

Since the end of the script has been reached, the <BSP> element and everything enclosed in it can now be discarded, and replaced (208) by the value of the generated content, the StringBuffer returned by our formatter. Since a StringBuffer is not a kind of DOM node object (305), in which case it would be assumed to directly represent the document structure to be inserted (306), its toString( ) method is invoked, and the contents of the resulting String are inserted into the document at this point (307). (In DOM terms, a Text node is created containing that String). Since the <BSP> has ended, the program returns to interpreting the content of the page as straight HTML, and this line will be passed through unchanged.

In line 19, the user is told the name of the server. The server name should not be hard-coded, since the website might be moved to another server. Accordingly, another <BSP> script (205, 302) is started, and the contents of the script are interpreted as BML (307, 206, 303, 304).

In this case, this information can be retrieved direct from the evaluation environment. The BSP servlet which implements this interpreter preloads the BML environment with several useful objects. One of them is the ServeletRequest being responded to, which is made available under the name "BSP_request", as shown in line 19, and its serverName property contains the information we want. Because the <property> tag in this line has no children, BML understands it as a request to retrieve the property's current value of the property rather than setting a new one. Again, the end of the script has been reached. The <BSP> script is removed from the generated web page and the value returned to it—the value of the serverName property—is inserted in its place (208, 305, 307). Note that the </BSP> end-tag can be followed immediately with HTML content, as is done in line 17 so that the comma will be placed adjacent to the server name, without intervening whitespace.

That completes the body of our document, and the document itself The updated document content can now be serialized back into XML/HTML syntax (208, 308) and delivered to the client as an HTTP response (210).

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for parsing by enabling scripts to be expressed in a language which creates, configures, and connects separately developed software objects to perform the scripted tasks, comprising the steps of:
   loading a document having a structure comprised of script and non-script components, where the script is a general-purpose nonprocedural software-component language whose base syntax is the same as the non-script components;
   identifying the script components;
   delineating the script components;
   handing the script components to an interpreter;
   returning an object from the interpreter corresponding to each script component;
   replacing script components in the document structure with the object returned from the interpreter; and
   updating the document structure.

2. The method of claim 1, wherein the scripts are Bean Server Page (BSP) scripts.

3. The method of claim 2, wherein the interpreter processes the BSP scripts as blocks of Bean Markup Language (BML) code.

4. The method of claim 2, wherein the replacing step replaces each BSP script with a Document Object Model (DOM) node.

5. The method of claim 2, wherein the replacing step replaces each BSP script with text resulting from a string conversion method.

6. The method of claim 1, wherein the identifying step is done by structural delineation.

7. The method of claim 1, wherein the delineation step comprises enclosing Bean Markup Language (BML) code in a <BSP> wrapper.

8. A computer program product comprising:
   a computer usable medium having computer readable program code embodied in the medium for parsing by enabling scripts to be expressed in a language which creates, configures, and connects separately developed software modules (objects) to perform the scripted tasks, the computer program product having:
   first computer program code for loading a document having a structure comprised of script and non-script components, where the script is a general-purpose nonprocedural software-component language whose base syntax is the same as the non-script components;
   second computer program code for identifying the script components;
   third computer program code for delineating the script components;
   fourth computer program code for handing the script components to an interpreter;
   fifth computer program code for returning an object from the interpreter corresponding to each script component;
   sixth computer program code for replacing script components in the document structure with the object returned from the interpreter; and
   seventh computer program code for updating the document structure under direct script control.

9. The computer program product as recited in claim 8, wherein the second computer program code identifies script components by means of structural delineation.

10. The computer program product as recited in claim 8, wherein the script components are Bean Server Page (BSP) scrips and the fourth computer program code processes the BSP scripts as blocks of Bean Markup Language (BML) code.

11. A system for processing a servlet which can be utilized in conjunction with a web server to give it the ability to recognize and process Bean Server Page (BSP) files, said system comprising:
   a BSP processor;
   an Extensible Markup Language (XML) serializer;
   means for recognizing a HyperTest Transfer Protocol (HTTP) request;
   means for parsing the HTTP request;
   means for retrieving a specified source file associated with the HTTP request from a storage repository; and
   means for passing the source file through said BSP processor and returning a resulting data stream from said XML serializer to a web server and a client.

12. The system as recited in claim 11, wherein said means for parsing is a HyperText Markup Language (HTML) parser.

13. The system as recited in claim 11, wherein said means for parsing is an XML parser.

14. The system as recited in claim 11, wherein said BSP processor comprises:

means for passing the source file to a parser for rendering a Document Object Model (DOM) representation;

means for searching a DOM representation for <BSP> elements;

means for passing any child elements associated with each respective <BSP> element to a Bean Markup Language (BML) interpreter, where BML is a general-purpose nonprocedural software-component language whose base syntax is the same as the non-script components;

means for evaluating the context of a Java object or a null reference returned from the interpreter;

means for replacing each <BSP> element in the DOM representation with either the evaluated object if is a suitable DOM node, or its string value; and means for passing the altered DOM representation to a serializer which generates an SML or HyperText Markup Language (HTML) representation of the resulting document.

\* \* \* \* \*